United States Patent
Tijink et al.

(10) Patent No.: US 11,580,506 B2
(45) Date of Patent: Feb. 14, 2023

(54) METHOD FOR ISSUING AUTHORISATION TICKETS IN AN INTELLIGENT TRANSPORT SYSTEM

(71) Applicant: Kapsch TrafficCom AG, Vienna (AT)

(72) Inventors: Jasja Tijink, Breitenfurt (AT); Refi-Tugrul Güner, Baden (AT)

(73) Assignee: Kapsch TrafficCom AG, Vienna (AT)

(*) Notice: Subject to any disclaimer, the term of this patent is extended or adjusted under 35 U.S.C. 154(b) by 470 days.

(21) Appl. No.: 16/736,502

(22) Filed: Jan. 7, 2020

(65) Prior Publication Data
US 2020/0242572 A1 Jul. 30, 2020

(30) Foreign Application Priority Data
Jan. 25, 2019 (EP) .................................. 19153722

(51) Int. Cl.
*H04W 4/40* (2018.01)
*H04L 9/32* (2006.01)
(Continued)

(52) U.S. Cl.
CPC ......... *G06Q 20/0457* (2013.01); *G06Q 10/02* (2013.01); *G06Q 20/102* (2013.01);
(Continued)

(58) Field of Classification Search
CPC .. G06Q 20/0457; G06Q 10/02; G06Q 20/102; G06Q 50/30; G07B 15/02;
(Continued)

(56) References Cited

U.S. PATENT DOCUMENTS 7,992,211 B2 * 8/2011 Dekker ............... H04N 21/442
380/241
10,853,592 B2 * 12/2020 Rodriguez ............ H04L 9/3213
(Continued)

OTHER PUBLICATIONS

Extended European Search Report received for European Patent Application No. 19153722.4, dated Jul. 11, 2019, 6 pages.
(Continued)

*Primary Examiner* — Kristine L Kincaid
*Assistant Examiner* — Lydia L Noel
(74) *Attorney, Agent, or Firm* — Fiala & Weaver P.L.L.C.

(57) ABSTRACT

The present application discloses a method of issuing pseudonymous authorisation tickets to nodes of a cooperative ITS, for signing messages, comprising: receiving a ticket request from a node in an authorisation server, and sending a validation request to an enrolment server, conducting a validity check in the enrolment server, and, when the validity check is passed, incrementing a counter value of a counter assigned to an account at an account server enrolled with the enrolment server for the requesting node, sending a validation message to the authorisation server, and issuing a pseudonymous authorisation ticket from the authorisation server to the requesting node, repeating the aforementioned steps until a predetermined charging period expires, and, upon expiry, sending, from the enrolment server to the authorisation server, said counter value, and sending a charging request calculated from said counter value from the authorisation server to the account server for charging said account.

5 Claims, 2 Drawing Sheets

Figure 1:
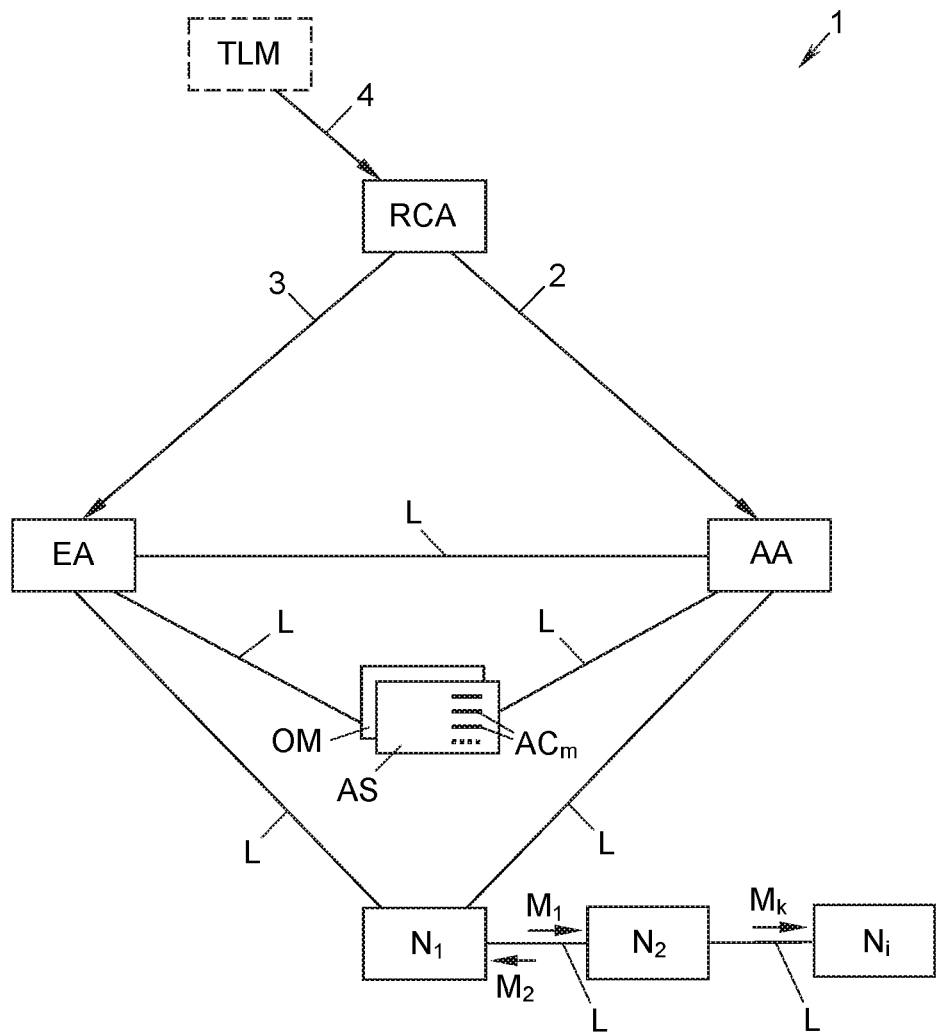

(51) Int. Cl.
*H04W 12/06* (2021.01)
*G07B 15/02* (2011.01)
*G06Q 20/04* (2012.01)
*G06Q 10/02* (2012.01)
*G06Q 20/10* (2012.01)
*G06Q 50/30* (2012.01)

(52) U.S. Cl.
CPC ............ *G06Q 50/30* (2013.01); *G07B 15/02* (2013.01); *H04L 9/3213* (2013.01); *H04L 9/3263* (2013.01); *H04W 4/40* (2018.02); *H04W 12/06* (2013.01); *H04L 2209/42* (2013.01)

(58) Field of Classification Search
CPC ..... G07B 15/00; H04L 9/3213; H04L 9/3263; H04L 2209/42; H04L 67/12; H04W 4/40; H04W 12/06; H04W 4/42; H04W 12/08; H04W 12/02; H04W 12/75; H04W 4/44
See application file for complete search history.

(56) References Cited

U.S. PATENT DOCUMENTS

| | | | |
|---|---|---|---|
| 2011/0289313 A1* | 11/2011 | Lowekamp | H04L 63/0807 726/10 |
| 2014/0316992 A1* | 10/2014 | Povolny | G06Q 20/0457 705/71 |
| 2016/0239653 A1* | 8/2016 | Loughlin-Mchugh | G06F 21/35 |
| 2019/0025845 A1 | 1/2019 | Wu | |

OTHER PUBLICATIONS

Bissmeyer, et al., "Development of Life-Cycle Management Components," Preserve Technical Report 6, Version v0.43, Sep. 2012, 48 pages.

* cited by examiner ically high levels. Nevertheless, it is desired to serve a large number of nodes such that all important traffic information is accessible for sharing within the ITS.

METHOD FOR ISSUING AUTHORISATION TICKETS IN AN INTELLIGENT TRANSPORT SYSTEM

CROSS-REFERENCE TO RELATED APPLICATION(S)

This application claims priority to European Patent Application No 19 153 722.4, filed on Jan. 25, 2019, the entirety of which is incorporated by reference herein.

BACKGROUND

Technical Field

The present disclosed subject matter relates to a method for issuing pseudonymous authorisation tickets to nodes of a cooperative intelligent transport system, which nodes exchange messages, each of which is signed with one of said authorisation tickets.

Background Art

An intelligent transportation system ("ITS") allows road users and traffic managers to share information exchanged by messages between vehicles and infrastructure (also known as "ITS stations", herein referred to as "nodes") in form of vehicle-to-vehicle (V2V) and/or vehicle-to-infrastructure (V2I) communication, and to coordinate their actions. Systems of such kind are known, inter alia, from the European Strategy on Cooperative Intelligent Transport Systems ("C-ITS"), an initiative discussing and implementing cooperative, connected and automated mobility in an ITS. A significant improvement in road safety, traffic efficiency and comfort of driving is expected from deploying an ITS in consequence of helping the driver—enabled by digital connectivity between vehicles and between vehicles and infrastructure—to take the right decisions and adapt to the traffic situation.

For many digital connectivity scenarios, the authenticity and integrity of the messages which typically contain information such as position, velocity, heading, etc. have to be verified with respect to the trustworthiness of the exchanged information. However, the impact on privacy of each road user should be minimized. For achieving those two objectives, it has been proposed by C-ITS that each message sent from one node shall be signed by a pseudonymous authorisation ticket that has been issued to the node upon its request by a trusted authorisation server (also known as "authorisation authority") and thereby ensures authenticity without the node identifying itself in the message. Each authorisation ticket may be used by the node to sign one or more messages; however, for reasons of privacy, used authorisation tickets shall be replaced by new ones frequently. Moreover, the identity of each node is certified by an enrolment server (also known as "enrolment authority"), with which each node has to enrol, and which validates each authorisation ticket prior to issuing by the authorisation server.

For privacy reasons, the authorisation server and the enrolment server, though communicating with each other, are separate from one another such that the authorisation server has no access to the identities of the nodes registered with the enrolment server and the enrolment server has no access to the authorisation tickets issued by the authorisation server.

While the authenticity and integrity of each message exchanged in the ITS can thereby be proven effectively, the number of pseudonymous authorisation tickets to be issued by the authorisation server is very high in an ITS having lots of nodes. Hence, the load on the authorisation server reaches high levels. Nevertheless, it is desired to serve a large number of nodes such that all important traffic information is accessible for sharing within the ITS.

BRIEF SUMMARY

It is an object of the present disclosed subject matter to provide a method for issuing pseudonymous authorisation tickets which facilitates the implementation of an ITS for a large number of nodes with improved privacy.

According to the present disclosed subject matter, this object is achieved by a method of the type mentioned in the outset, comprising:

a) receiving a ticket request from a node in an authorisation server of the ITS, which ticket request contains enrolment credentials of the requesting node, wherein the enrolment credentials are encrypted with a public key of an enrolment server of the ITS, and sending a validation request containing the requesting node's enrolment credentials to the enrolment server;

b) decrypting the enrolment credentials contained in the validation request with a respective private key in the enrolment server, conducting a validity check which is only passed when both the requesting node identified by the decrypted enrolment credentials and, for the requesting node, an account at an account server are enrolled with the enrolment server, and, in case the validity check is passed, incrementing a counter value of a counter assigned to said account and sending a validation message to the authorisation server;

c) issuing, when the validation message is received in the authorisation server, a pseudonymous authorisation ticket to the requesting node;

d) repeating steps a) to c) until a predetermined charging period expires, and, upon expiry, sending, from the enrolment server to the authorisation server, a message containing said counter value and an identifier for said account, calculating, from the counter value received in the authorisation server, a charging request for the account identified by the received identifier, and sending the charging request to the account server for charging said account.

The present method allows for offering the issuing of pseudonymous authorisation tickets by the authorisation server in form of a decentralized charged service. Thereby, new authorisation servers may, even one-by-one, be added to the ITS and a sharing of efforts (or load) between the authorisation servers is facilitated such that even a large—and still growing—number of nodes can be served in the ITS.

Concurrently, the privacy of each node is not only kept but even improved due to the fact that a relation between an issued ticket and a requesting node cannot be derived from the accumulated counter value. Hence, the authorisation server, despite issuing the authorisation tickets to the respective requesting nodes and sending charging requests to the account server for charging the account of the requesting node, does not have the information necessary to create a link between a node's identity or account and the authorisation tickets issued to the node. Moreover, the authorisation server cannot decrypt the enrolment credentials of the requesting node in the ticket request. Consequently, neither the authorisation server nor the enrolment server, which has no information on the issued authorisation tickets, can retrace which authorisation ticket was issued to which node. It shall be noted in this context that the node when sending a ticket request uses, e.g., a one-time identifier or the like for identification vis-à-vis the authorisation server.

It shall be understood that there may be more than one account server. Each account server may keep one or more accounts and each account may be enrolled with the enrolment server for one or more authorisation servers and/or for one or more nodes. In an advantageous embodiment, the account at the account server is enrolled with the enrolment server for more than one node. Hence, when several nodes, e.g., vehicles of a specific manufacturer and/or type, share a common account, the account is charged for all authorisation tickets issued by the authorisation server to all nodes sharing this account. By such an accumulation of charges privacy is further enhanced. In an alternative embodiment, however, the account at the account server is enrolled with the enrolment server for a single node such that each node, i.e., its account, is charged separately from other nodes, i.e., accounts. Even in this case, neither the enrolment server nor the authorisation server has sufficient information to determine which authorisation ticket has been issued to which requesting node due to the accumulating counter used in the charging period such that privacy is improved.

For plausibility checking and/or dispute resolution, step c) may further comprise storing the received validation message in a database of the authorisation server. The authorisation server can then check the counter values received from the enrolment server for all accounts against the total number of authorisation tickets issued to all requesting nodes during the charging period and, if there is a discrepancy, a dispute resolution can be initiated.

In an embodiment, the message containing the counter value and the identifier for the account is digitally signed by the enrolment server prior to sending. Thereby, the authenticity of the message is ensured such that manipulation is avoided and discrepancies or disputes can be settled on a certified basis. It shall be noted, though, that an even more extensive security architecture, e.g., according to the standard ETSI TS 102 940, may be employed with support of a public key infrastructure (PKI) using changing pseudonym certificates that may be issued by, e.g., a root certificate authority which approves both the authorisation server and the enrolment server. Moreover, the communication in the ITS may generally be encrypted and each participant; i.e., each of the nodes, the enrolment server, the authorisation server and the account server, may be capable of generating cryptographic keys and/or key pairs to share with one another.

BRIEF DESCRIPTION OF THE DRAWINGS/FIGURES

Figure 2:
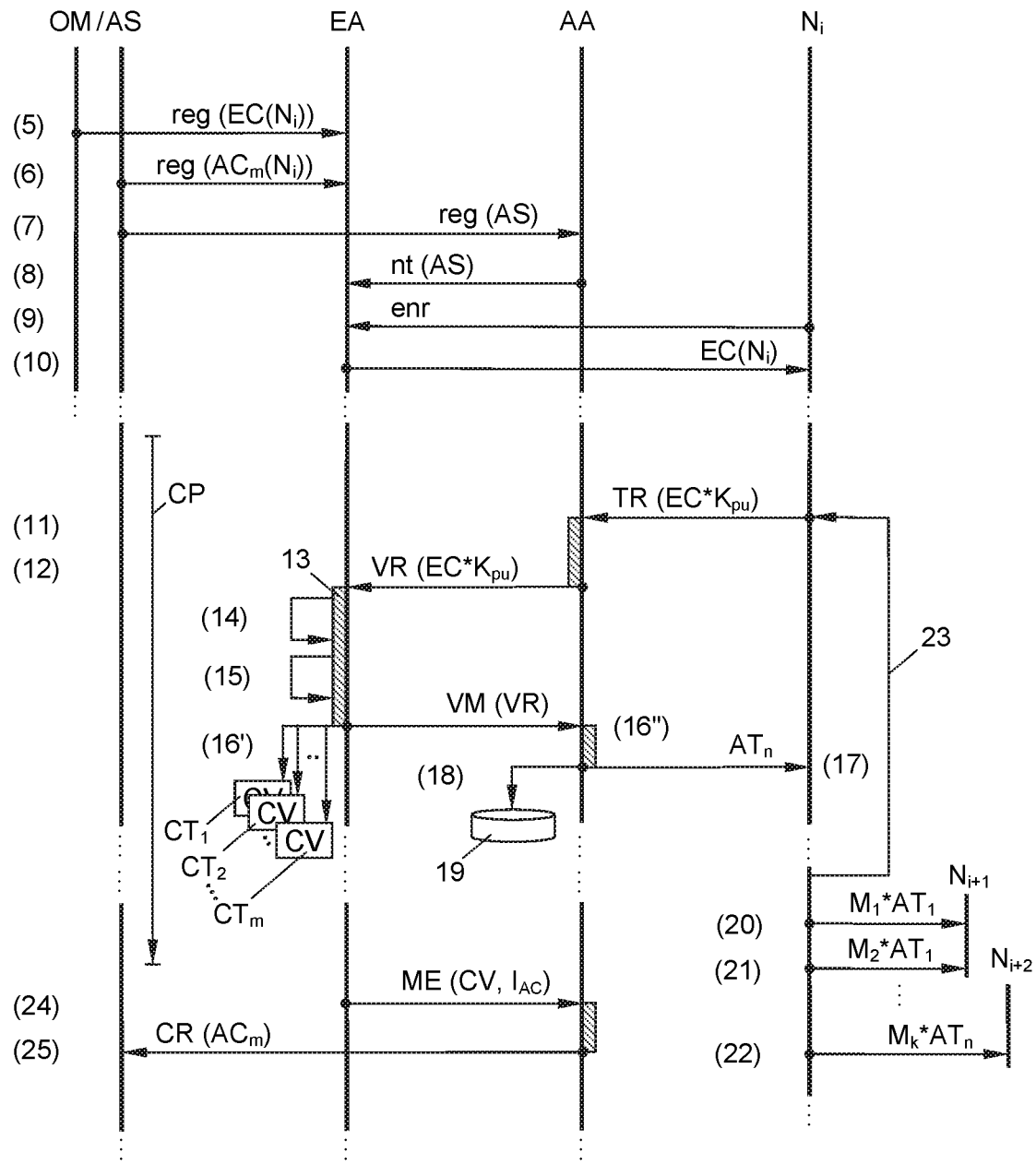

The disclosed subject matter shall now be explained in more detail below on the basis of exemplary embodiments thereof with reference to the accompanying drawings, in which:

FIG. 1 shows a cooperative intelligent transportation system in a schematic block diagram; and FIG. 2 shows the method embodiment for issuing pseudonymous authorisation tickets to nodes of the cooperative intelligent transport system of FIG. 1 in a sequence diagram.

DETAILED DESCRIPTION

FIG. 1 shows an example of a cooperative intelligent transportation system ("ITS") 1, e.g., an ITS 1 according to the European Strategy on Cooperative Intelligent Transport. Systems ("C-ITS"). Within the ITS 1, the method shown in FIG. 2 is performed. The ITS 1 comprises a plurality of nodes $N_1$. $N_2$, . . . generally $N_i$, that exchange messages $M_1$, $M_2$, . . . generally $M_k$. Each node $N_i$ is, e.g., a vehicle or an infrastructure device such that the exchange of messages $M_k$ allows road users and traffic managers of the ITS 1 to share information, e.g., by vehicle-to-vehicle ("V2V") and/or by vehicle-to-infrastructure ("V2I") communication.

As will be explained in greater detail below in the context of FIG. 2, the ITS 1 comprises at least one enrolment server (also: "enrolment authority") EA and at least one authorisation server (also: "authorisation authority") AA. The ITS 1 optionally further comprises at least one root certificate authority RCA which approves (arrows 2 and 3, respectively) both the authorisation server AA and the enrolment server EA, and an optional trust list manager TLM for enabling (arrow 4) the root certificate authority RCA. Moreover, the ITS 1 comprises at least one of one or more operators/manufacturers OM and one or more account servers AS, wherein each account server AS keeps one or more accounts $AC_1$, $AC_2$, . . . , generally $AC_m$, each for one or more nodes $N_i$ and, when the ITS 1 comprises more than one authorisation server AA, for one or more authorisation servers AA. For communication between the enrolment server EA, the authorisation server AA, the operator/manufacturer OM, the account server AS, and the nodes $N_i$, the ITS 1 has communication links L, e.g., wire-bound and/or wireless communication links L. Each communication link L may either be direct or via intermediate nodes $N_i$.

Each message $M_k$ exchanged in the ITS 1 shall be authenticated for controllability and for preventing manipulation. At the same time, privacy of the nodes $N_i$ shall be kept. For achieving both, each message $M_k$ is signed with a pseudonymous authorisation ticket $AT_1$, $AT_2$, . . . , generally $AT_n$ (FIG. 2). The method of issuing these authorisation tickets $AT_n$ shall now be explained in detail with reference to FIG. 2.

Each node $N_i$ is identified in the enrolment server EA by means of enrolment credentials EC which are suitable to unambiguously identify the node $N_i$. In the example shown in FIG. 2, in a first step 5 of the method the operator/manufacturer OM registers information on each node $N_i$—including the enrolment credentials EC thereof—with the enrolment server EA as known from, e.g., C-ITS. In another embodiment, the enrolment credentials EC may be generated by the node $N_i$ itself or provided to the node $N_i$, e.g., by the operator; manufacturer OM, and are then shared with the enrolment server EA.

In step 6, the account server AS registers the respective account $AG_m$ for each node $N_i$ and, in case of more than one authorisation server AA, for at least one authorisation server AA with the enrolment server EA. In an optional embodiment when the account server AS is run by the operator/manufacturer OM such that it is integrated therein, steps 5 and 6 may be merged. Again, the account $AC_m$ for a node $N_i$ may alternatively be shared with the enrolment server EA by the node $N_i$ itself, e.g., after having been provided therewith by the account server AS. In an alternative embodiment, the account server AS is run by the enrolment server EA such that it is integrated therein; in this case, step 6 may not be required, e.g., when the node $N_i$ itself registers its respective account $AC_m$ with the enrolment server EA, for example, during enrolment as described below.

In step 7, the account server AS registers with the authorisation server AA. This registration may be notified to the enrolment server EA in step 8 either upon registration or upon a later request by the enrolment server EA. In another embodiment this registration with the authorisation server AA and/or the notification thereof to the enrolment server EA may be a precondition for approving the account server AS in the ITS 1 such that steps 7 and/or 8 are unnecessary.

After registration, the node $N_i$ sends an enrolment request (step 9) to the enrolment server EA. When the node $N_i$ is identified based on said registered information the enrolment server EA sends back the enrolment credentials EC, and the respective account $AC_m$ at the account server AS is enrolled for the node $N_i$ (step 10). The enrolment credentials EC of each node $N_i$ may be changed occasionally or regularly.

For having an authorisation ticket $AT_n$ issued after enrolment, the node $N_i$ sends a ticket request TR to the authorisation server AA in step 11. The ticket request TR contains the enrolment credentials EC of the requesting node $N_i$, i.e., of the node $N_i$ which sends the ticket request TR. The enrolment credentials EC of the requesting node $N_i$ are encrypted by the requesting node $N_i$ with a public key $K_{pu}$ of the enrolment server EA. The public key $K_{pu}$ is part of an asymmetric encryption scheme as known in the art; therein, data encrypted with said public key $K_{pu}$ can only be decrypted with a respective private key $K_{pr}$ of the enrolment server EA, which private key $K_{pr}$—being "private"—is only known to the enrolment server EA. Hence, the authorisation server AA has no access to the encrypted enrolment credentials EC and, particularly, cannot derive any information on the identity of the requesting node $N_i$ therefrom.

After receiving a ticket request TR, the authorisation server AA generates, in step 12, a validation request VR which contains the encoded enrolment credentials EC of the requesting node $N_i$. In some embodiments, the validation request VR contains further parts of the ticket request TR or even the complete ticket request TR of the requesting node $N_i$. In step 12, the authorisation server AA also sends the generated validation request VR to the enrolment server EA for validation. Upon reception of said validation request VR, the enrolment server EA conducts a validity check 13.

The validity check 13 comprises at least the following criteria of validity that are checked independently from each other, i.e., in any sequence and/or in parallel. A first criterion is checked in step 14 and concerns the enrolment of the requesting node $N_i$ such that the first criterion is only satisfied when the requesting node $N_i$ identified by the decrypted enrolment credentials EC is enrolled with the enrolment server EA: otherwise, the validity check 13 is not passed. A second criterion is checked in step 15. The second criterion is only satisfied when the account $AC_m$ at the account server AS is enrolled with the enrolment server EA for the identified requesting node $N_i$. Further criteria may be checked in the validity check 13, e.g., that the account server AS is registered with the authorisation server AA when this is not a precondition in the ITS 1. Only when all criteria are satisfied, the validity check 13 is passed; otherwise, the validity check 13 is not passed.

To each account $AC_m$ enrolled with the enrolment server EA a separate counter $CT_1, CT_2, \ldots$, generally $CT_m$, is assigned. When the validity check 13 is passed, the enrolment server EA, in step 16', increments a counter value CV of that counter $CT_m$ in the enrolment server EA which is assigned to the account $AC_m$ enrolled with the enrolment server EA for the requesting node $N_i$. Moreover, the enrolment server EA validates the validation request VR, e.g., by sending a validation message VM to the authorisation server AA in step 16" in reply to the validation request VR, when the validity check 13 has been passed. When, on the other hand, the validity check 13 has not been passed, the enrolment server EA does not increment the counter $CT_m$ and does not validate the validation request VR, e.g., by not sending a message to the authorisation server AA in reply to the validation request VR (implicitly), or by sending a message that is different from the validation message VM to the authorisation server AA in reply to the validation request VR (explicitly).

When the authorisation server AA receives the validation message VM in reply to the validation request VR, i.e., when the validation request VR was validated by the enrolment server EA, the authorisation server AA generates and issues a pseudonymous authorisation ticket $AT_n$ to the requesting node $N_i$ in step 17. In an optional step 18, the authorisation server AA stores the received validation message VM in a database 19 thereof for later plausibility check and/or dispute resolution.

It shall be noted that the requesting node $N_i$ identifies itself vis-à-vis the authorisation server AA for addressability, by means of a one-time identifier or the like as known in the art, such that the true identity of the node $N_i$ remains undisclosed to the authorisation server AA.

After having received the issued authorisation ticket $AT_n$ from the authorisation server AA, the requesting node $N_i$ can use the authorisation ticket $AT_n$ once or several times to sign and thereby pseudo-anonymise messages $M_1, M_2, \ldots, M_k$ that the node $N_1$ sends to other nodes $N_{i+1}, N_{i+2}, \ldots$, see steps 20 to 22.

Until a predetermined charging period CP expires, said sending and receiving ticket requests TR, validation requests VR and validation messages VM and said issuing authorisation tickets $AT_n$ is repeated (arrow 23). Upon expiry of the charging period CP, the enrolment server EA sends a message ME to the authorisation server AA (step 24), which message ME contains the counter value CV of the counter $CT_m$ assigned to said account $AC_m$ and an identifier $I_{AC}$ of the account $AC_m$ at the account server AS. It is understood that, when the ITS 1 has more than one account server AS, the account server AS which keeps said account $AC_m$ is also indicated by the identifier $I_{AC}$.

As the ITS 1 comprises a multiplicity of nodes said message ME contains, in one embodiment, the counter values CV of some or all counters $CT_m$ respectively assigned to the accounts $AC_m$ of some or all requesting nodes and the respective identifier $I_{AC}$; in an alternative embodiment, the enrolment server EA sends a separate message ME for each counter value CV and account $AC_m$ which the respective counter $CT_m$ is assigned to. Optionally, the message ME is digitally signed by the enrolment server EA prior to sending. After sending said message ME, the counter value CV of each counter $CT_m$ in the enrolment server EA is optionally reset for a subsequent charging period CP.

In step 25, the authorisation server AA calculates, from each received counter value CV, e.g., by means of an agreed multiplier, a respective charging request CR for the account $AC_m$ identified by the received identifier $I_{AC}$. Then, the authorisation server AA sends the charging request CR to the account server AS for charging each of said accounts $AC_m$. Thereby, the issuing of authorisation tickets $AT_n$ is charged.

CONCLUSION

It shall be noted that the communication between nodes $N_i$, the authorisation server AA, the enrolment server EA, the operator/manufacturer OM and/or the account server AS is optionally encrypted by further keys of a symmetric or an asymmetric encryption scheme as known in the art. Thus, the disclosed subject-matter is not restricted to the specific embodiments described in detail herein, but encompasses all variants, combinations and modifications thereof that fall within the framework of the appended claims.

What is claimed is:

1. A method for issuing pseudonymous authorisation tickets to nodes of a cooperative intelligent transport system (ITS), which nodes exchange messages, each of which is signed with one of said pseudonymous authorisation tickets, the method comprising:
   a) receiving a ticket request from a node in an authorisation server of the ITS, which ticket request contains enrolment credentials of the requesting node, wherein the enrolment credentials are encrypted with a public key of an enrolment server of the ITS, and sending from the authorisation server a validation request containing the requesting node's enrolment credentials to the enrolment server;
   b) decrypting the enrolment credentials contained in the validation request with a respective private key in the enrolment server, conducting, in the enrolment server, a validity check which is only passed when both the requesting node identified by the decrypted enrolment credentials and, for the requesting node, an account at an account server are enrolled with the enrolment server, and, in case the validity check is passed, incrementing, in the enrolment server, a counter value of a counter assigned to said account and sending, from the enrolment server to the authorisation server, a validation message validating the validation request of the authorisation server;
   c) issuing, when the validation message validating the validation request of the authorisation server is received in the authorisation server, one of said pseudonymous authorisation tickets to the requesting node;
   d) repeating steps a) to c) until a predetermined charging period expires, and, upon expiry,
   sending, from the enrolment server to the authorisation server, a message containing said counter value and an identifier for said account,
   calculating, from the counter value received in the authorisation server, a charging request for the account identified by the received identifier, and sending the charging request from the authorisation server to the account server for charging said account.

2. The method according to claim 1, wherein the account at the account server is enrolled with the enrolment server for more than one node.

3. The method according to claim 1, wherein the account at the account server is enrolled with the enrolment server for a single node.

4. The method according to claim 1, wherein step c) further comprises storing the received validation message in a database of the authorisation server.

5. The method according to claim 1, wherein the message containing the counter value and the identifier for the account is digitally signed by the enrolment server prior to sending.

* * * * *